United States Patent

Blackshire et al.

[11] Patent Number: 5,538,278
[45] Date of Patent: Jul. 23, 1996

[54] IGNITION TRAIN APPARATUS FOR HYBRID AIRBAG INFLATORS

[75] Inventors: Robert D. Blackshire, Glendale; Milan L. Storch, Tempe; Clyde L. Jones, Laveen, all of Ariz.

[73] Assignee: Ad Astram Enterprises, Inc., Scottsdale, Ariz.

[21] Appl. No.: 259,617

[22] Filed: Jun. 14, 1994

[51] Int. Cl.⁶ ............................................. B60R 21/26
[52] U.S. Cl. ............................................. 280/736; 280/737
[58] Field of Search ................................. 280/736, 737, 280/741, 742; 222/3, 5

[56] References Cited

U.S. PATENT DOCUMENTS

| | | | |
|---|---|---|---|
| 2,400,103 | 5/1946 | Cobb | 102/202.14 |
| 3,180,373 | 4/1965 | Hebenstreit | 222/5 |
| 3,256,056 | 6/1966 | Armstrong | 102/202.14 |
| 3,723,205 | 3/1971 | Scheffee | 280/741 |
| 3,741,580 | 6/1973 | Vos | 280/735 |
| 3,743,318 | 7/1973 | Yamaguchi et al. | 280/737 |
| 3,785,149 | 1/1974 | Timmerman | 280/741 |
| 3,815,935 | 6/1974 | Jones | 280/735 |
| 3,822,895 | 7/1974 | Ochiai | 280/737 |
| 3,834,729 | 9/1974 | Oka et al. | 280/737 |
| 3,868,124 | 2/1975 | Johnson | 280/737 |
| 3,895,821 | 7/1975 | Schotthoefer et al. | 280/737 |
| 4,033,610 | 7/1977 | Shingu et al. | 280/737 |
| 4,070,970 | 1/1978 | Scamaton | 102/202.8 |
| 4,084,839 | 4/1978 | Takigi et al. | 280/737 |
| 5,031,932 | 7/1991 | Frantom et al. | 280/741 |
| 5,033,772 | 7/1991 | Frantom et al. | 280/737 |
| 5,131,680 | 7/1992 | Coultas et al. | 280/737 |
| 5,152,550 | 10/1992 | Hoagland et al. | 280/737 |
| 5,226,561 | 7/1993 | Hamilton et al. | 280/737 |
| 5,242,194 | 9/1993 | Popek | 280/737 |
| 5,257,819 | 11/1993 | Frantom et al. | 280/737 |
| 5,263,740 | 11/1993 | Frey | 280/737 |

*Primary Examiner*—Paul N. Dickson
*Attorney, Agent, or Firm*—O'Connor Cavanagh

[57] ABSTRACT

An improved hybrid airbag inflator comprises a container for storing a compressed gas having a rupturable wall defining an exit opening. A pyrotechnic gas generator has an output directed into the container for adding heat and mass flow to the compressed gas in the container. The pyrotechnic generator may also have a second output directed into a manifold leading from the container to the airbag, the second output entering the manifold downstream from the inlet nozzles that restrict the flow of compressed gas into the manifold. Adding the second output directly to the manifold increases the energy content of the gas filling the airbag without physically changing the size of the inlet nozzles, thereby allowing a readily controllable staged flow of gases into the airbag.

7 Claims, 3 Drawing Sheets

IGNITION TRAIN APPARATUS FOR HYBRID AIRBAG INFLATORS

TECHNICAL FIELD

This invention relates to an improved ignition train apparatus with ignition delay sequencer to provide an adjustable pressure onset timing and a bypass gas flow control nozzle to regulate the flow rate of the stored gas from the pressure storage vessel of hybrid airbag inflators.

BACKGROUND ART

It is known from previous designs of hybrid airbag inflators that proper time phasing in the flow of gases, is critical for achieving an optimum airbag inflation sequence and preventing injuries to the vehicle occupants. If the time phasing is too rapid, the occupants will be subject to injuries form the large deployment forces. If the time phasing is too slow, the airbag fails to attain full deployment in time to prevent injury to the occupants. It is also known that a controlled onset of gas flow rate followed by a controlled high rate phase of deployment is desired in the proper function of the inflator to address protection of the out of position passenger, particularly the standing child situated in the area in which the airbag is deployed. Various approaches in the prior art have not fully resolved this problem.

In the hybrid type of inflator, this is achieved by initially rupturing the closure disk containing the cold gas in the high pressure source, then providing a phased flow of the hot gas from the solid propellant gas generator a short time (millisecond time frame) later. Gas flow control is achieved by dimensional and spatial relationship between the nozzle, the manifold and the diffuser ports.

In the pyrotechnic type of inflators the variable flow can be achieved by shaping the geometry and the burn rates of the gas producing propellant grains to provide an initial low flow rate, followed by a higher final flow rate of gases to achieve the desired staging. In the pure stored cold gas inflator, the staging must be accomplished using variable sequentially opened flow restrictions. This is accomplished by using eroding nozzles or some mechanical means to change the nozzle geometry, resulting in mechanisms subject to the effects of the large magnitude impact forces before and during function. None of the above systems have attained the optimum level of flow control.

In order to achieve the required staging for the inflation of the airbag in hybrid type airbag, the prior art has involved a number of approaches, using a combination of explosive means combined with mechanisms to achieve the desired results. One such approach is disclosed in U.S. Pat. No. 5,226,561 in which an initial explosive charge propels a projectile through the seal disk releasing the cold gas, then a spring pin mechanism which provides a short delay actuates a gas generating means to supply the hot gas. Although this concept has a short delay which provides some initial ignition staging it fails to provide gas flow control throughout the remainder of the functional cycle. In a second approach shown in U.S. Pat. No. 5,242,194 a hollow piston rod with an attached circular cutter punctures the seal disk and subsequently conducts flame from the igniter through the hollow piston rod to initiate the propellant ignition material. No delay or gas flow staging is provided by this concept. In other approaches as shown in U.S. Pat. Nos. 3,895,821 and 5,257,819 the propellant is disposed outside the high pressure cold gas storage vessel and uses pressure from the propellant, through complex mechanical means to rupture the seal disk and mix the cold and hot gases. No delay or gas flow staging is provided by these concepts. U.S. Pat. No. 5,263,740 describes several arrangements of a detonator to rupture the pressure vessel seal and to ignite various internal gas or heat producing materials to augment the total gas flow. No delay or gas flow staging is provided by any of the concepts presented in this patent.

Prior art single nozzle designs cannot be effectively sized to control both the initial onset rate of gas flow and the subsequent higher flow rate required for airbag inflation. Most of these approaches involve relatively large masses of mechanical components that are subject to the vehicle impact loads upon impact. Their proper function is influenced by these unpredictable magnitude impact loads, resulting in variations of function and timing, and therefore the proper staging of the inflation process of the airbag.

This improved ignition train apparatus of this invention contains no large moving masses which are subject to the impact loading, but obtains the desired staging by means of the initial disk rupture by the high velocity gas and metallic particle stream from a standard high energy initiator, the subsequent delay sequencer and bypass nozzle system in the ignition train apparatus for the hot gas generator. Additional focusing of the high velocity gas and metallic particle stream may be achieved by adjusting the geometry of the initiator housing.

OBJECTS AND ADVANTAGES

Objects and advantages of the present invention are:

a. to provide a hybrid inflator delay ignition apparatus and dual nozzles to achieve adjustable timing in the flow rate of the stored gas from the pressure storage vessel and the flow rate of heated gases from the gas generating means;

b. to provide a hybrid inflator ignition apparatus which provides optimum staging of the airbag deployment to accommodate the out of position passenger;

c. to provide a hybrid inflator ignition apparatus which reduces the size, weight and cost of the hybrid airbag inflator;

d. to provide a hybrid inflator ignition apparatus to establish new technology that will lead to development of a light weight driver side hybrid airbag inflator;

e. to provide a hybrid inflator ignition apparatus which increases the performance reliability through simplification of the seal disk penetration mechanism and the propellant ignition sequence;

f. to provide a hybrid airbag inflator ignition apparatus that provides greater flexibility of performance as needed in the various sizes and types of vehicles in which the inflators will be installed;

g. to provide a hybrid inflator ignition apparatus that will enable modular designs for airbag inflators that can be produced at less cost than the before stated designs.

h. to provide a hybrid airbag inflator ignition apparatus having no moving parts to improve reliability of performance;

SUMMARY OF THE INVENTION

The invention provides an improved ignition train apparatus with gas flow staging control for an airbag inflation apparatus which is disposed in a vehicle such as an automobile, van, truck, or any other vehicle requiring such an apparatus. The improved ignition train apparatus with gas flow staging control for the said inflation device will cause it operate in a controlled manner, to inflate the airbag when the vehicle in which the device is disposed is impacted. An impact sensing means detects the impact to the vehicle and provides an electrical current to the initiator of the inflator to initiate function. Such an inflation device containing the improved ignition train apparatus usually has a gas containing means provided with an inert pressurized gas, a gas generating means with a combustible gas generating material, an actuating means for igniting the gas generating material, an electrical initiating means responsive to the said electrical current. The gas releasing means is comprised of a pressure seal disk separating the pressurized inert gas means and the gas generating means from the airbag and is made to rupture upon activation of the initiating means, whereby gas is released from both gas means in a staged sequence and flows through the manifold into and inflates the airbag.

In the preferred embodiment of this invention, the gas generating means and the pressurized inert gas means are separated from the airbag by a sealed manifold which provides a channel for communication of the gas generating means with the interior volume of the airbag. The channel of the manifold is separated from the gas sources by the seal disk which inhibits the flow of gases. The volume of the stored inert gas and its pressure are determined by the type and size of vehicle in which the inflator is disposed. The quantity of the combustible gas generating material and its geometric configuration are likewise determined.

A primary initiating device is axially disposed in alignment with the center of the seal disk. A primer is disposed in axial alignment with the center of the seal disk and the output path of the initiating device and just inside the seal disk in the cold gas vessel. The primer is capable of igniting a secondary ignition charge in the delay train apparatus. A pyrotechnic delay is disposed in line with and activated by the secondary ignition charge. The delay column is designed to provide a short (millisecond) delay and then ignite the propellant ignition charge which ignites the propellant of the gas generating means.

Also included in both the embodiments of this invention is a bypass flow control aperture, nozzle, opening, or other passageway (hereinafter "nozzle") located in the ignition train apparatus assembly next to and in parallel with the pyrotechnic delay column. This nozzle provides a means to further control the sequence of staging of the flow rates of the cold gas and the hot gases and further provides more efficient mixing of the hot and cold gases as they flow into the airbag during the device function.

When the vehicle in which the said inflation device is disposed is involved in a collision, the impact sensing means detects the impact and sends an electrical current from the source of electrical energy and stimulates the initiating means of the inflation device. The initiation device functions to produce a stream of hot gas and metallic particles at high velocity which penetrates through the seal disk. The stream from the initiator, in cooperation with the high pressure of the stored gas causes the sealing means to rupture, allowing the flow of the cold gas though the manifold into interior of the bag, causing it to begin inflation. At the same instance, the stream of hot particles and gases from the initiating means strikes the primer of the gas generating means igniter. The primer, which fires into the secondary ignition charge of the gas generator actuating means, causes the initiating charge contained therein to ignite. The heat and hot particles from the secondary ignition charge, in turn, produces ignition of the pyrotechnic delay column which is designed to burn for a predetermined time before igniting the propellant ignition charge. This causes a short delay (milliseconds) between the rupture of the seal disk and the ignition of the combustible material in the gas generator, permitting the stored inert gases to flow for the predetermined time prior to the ignition of the combustible material in the gas generator. The desired time delay for the pyrotechnic delay column is variable and depends upon the size of the vehicle in which the inflation device is disposed and the volume of the bag and time required for its full inflation. The hot gases generated by the combustible material in the gas generator mix with the cold gas in the cold gas containment means and the manifold to provide further enhanced gas flow to augment the full inflation of the airbag.

A second embodiment of this invention consists of disposing only a secondary ignition means in the hot gas generating means igniter assembly at a location to center it in the direct line of impingement of the high velocity gas and hot particle stream from the initiator. In this embodiment the initiator is activated upon receiving the electrical current from the power source upon vehicle impact. This causes the initiator to function, producing the high velocity stream of hot gases and metal particles. The high velocity stream successively impinges the seal disk, which with the cooperation of the force from the high pressure inert gases causes it to rupture completely, releasing the cold gases through the manifold. The high velocity stream then impinges upon the closure of the secondary ignition charge, penetrating through it. The pressure and heat from the stream of hot gas and metallic particles are then induced into the secondary charge, causing it to ignite. The secondary charge then actuates the delay column and finally the propellant ignition charge which in turn ignites the combustible solid which produces the hot gases which augments, in staged sequence, the inert cold gases as they flow through the manifold. The gases produced by the generating means thus mix with the cold inert gas and enter into the interior of the airbag to inflate it completely in a controlled manner and sequence.

BRIEF DESCRIPTION OF THE DRAWINGS

The description of the various embodiments of the invention will be further explained upon reference to the drawings which are contained in the following discussion of the various embodiments of the invention. Those skilled in the art will readily recognize the improved features and function of the invention through a review of these drawings and the reading of the description of the various embodiments which are contained herein.

Figure 1:
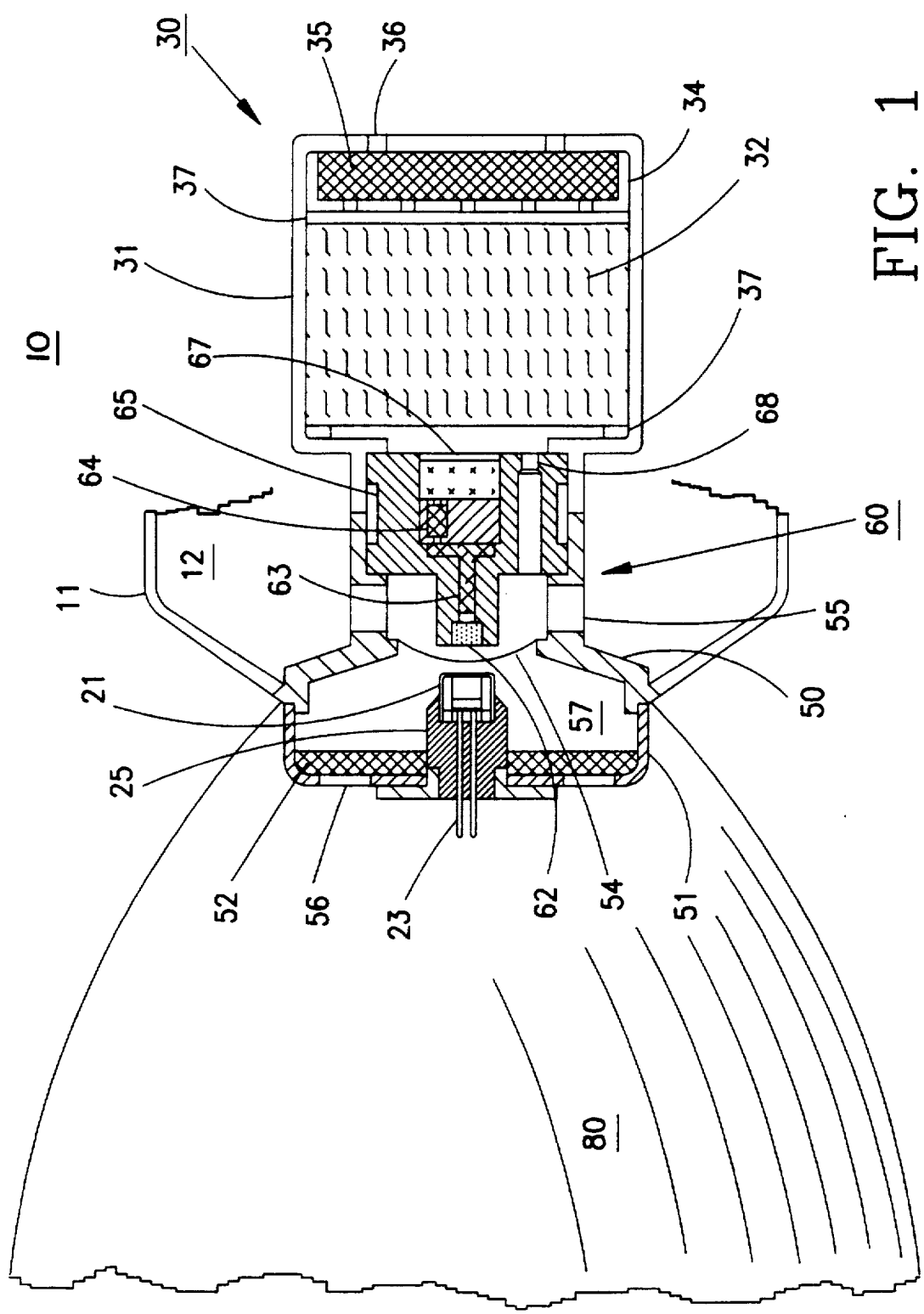
FIG. 1 is a sectional view of a typical hybrid inflation device containing the improved ignition train apparatus and bypass nozzle in the configuration of the preferred embodiment of the invention, showing all of the elements which make up the invention.

| Reference Numbers in Drawings | |
|---|---|
| Part Name | Part Name |
| 10. Inflation device | 11. Gas storage means |
| 12. Stored gas | 14. Fill port |
| 20. Initiator assembly | 21. Initiating means |
| 23. Electrical contacts | 25. Initiator support |
| 29. Stream of gases and particles | 30. Gas generating means |
| 31. Generator housing | 32. Combustible material |
| 34. Grain trap | 35. Filter |
| 36. Nozzle | 37. Spacers |
| 40. Actuation means | 43. Ignition charge |
| 44. Delay column | 45. Igniter housing |
| 47. Output ignition charge | 49. Closure disk |
| 50. Manifold | 51. Initiator housing |
| 52. Filter | 54. Seal disk |
| 55. Nozzle | 56. Ports |
| 57. Channel | 60. Activation means |
|  | 62. Primer |
| 63. Ignition material | 64. Delay column |
| 65. Igniter housing | 67. Output ignition charge |
| 68. Bypass nozzle | 80. Airbag |

DESCRIPTION OF THE PREFERRED EMBODIMENT OF THE INVENTION

The various embodiments of the improved ignition train apparatus and bypass nozzle for the hybrid inflator device are shown in FIGS. 1 through 5 of the drawings. The figures show only one form of the invention. Other forms necessary to meet the design requirements of the various vehicles in which the inflation device using the improved ignition train apparatus and bypass nozzle are disposed are included in this invention. The improved inflator ignition train apparatus is disposed in a hybrid inflator generally shown in FIG. 1. The inflation device 10 has a gas containment means 11 which contains the stored inert gas 12 and preferably a gas generating means 30. The gas generating means 30 contains a combustible material 32 which, upon burning, provides high temperature gases which are mixed with and augment the pressurized inert cold gas 12 to inflate the airbag 80. The inflation device 10 contains a gas generating means 30 and an activation means 60 for initiating the burning of the combustible material 32.

Figure 2:
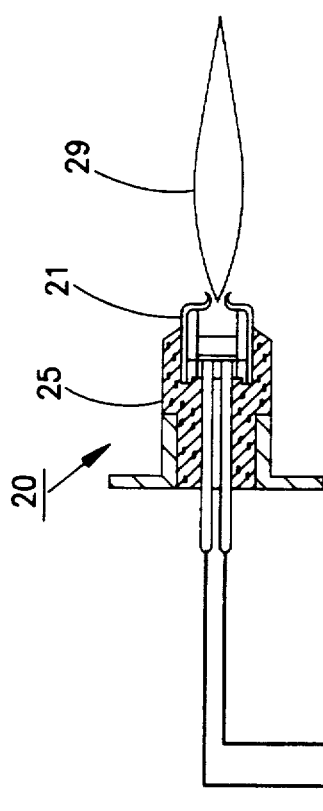
FIG. 2 is a schematic view of the initiator function applicable to all embodiments of the invention.

The manifold 50 provides a channel 57 for communication of the high pressure gas 12 through ports 56 to the airbag 80. A seal disk 54 is disposed in the channel 57 which prevents the flow of gases prior to actuation of the initiating means 21. The seal disk 54 is a prestressed metal material configured to contain the high pressure gas 12 until the high velocity stream of gases and particles 29 shown in FIG. 2, are produced upon activation of the initiation means 21. The high velocity stream of hot gases and particles of 29 impinge upon the seal disk 54, causing sufficient stress to cause the seal disk 54 to rupture in a predetermined manner. The rupture of the seal disk 54 opens the channel 57 in the manifold 50 producing an initial flow of stored gas 12 into the interior of the airbag 80. The pressurized stored gas provides a significant fraction of the total gases required to fully inflate the airbag 80, and may range in pressure from 2000 psig to 5000 psig. The improved ignition train apparatus and flow control nozzle of this invention will provide improved time phasing between the flow of the inert stored gas 12 and the hot gas from the gas generating means 30 to insure a proper inflation sequence to adequately protect the passenger in which the inflation device 10 is disposed.

The gas storage means 11 may be coaxial with the gas generating means 30 which is disposed within the gas storage means 11. The gas generating means 30 is joined by a metal fusion process to the manifold 50 and retains the activation means 60. The combination of the manifold 50 and the gas generating means 30 is joined to the gas storage means 11 of the inflation device 10 by a fusion process. The joining of the gas storage means 11, the gas generating means 30, the manifold 50 with the seal disk 54, and the fill port 14 provide an hermetic seal to prevent leakage of the stored gas 12 from the inflation device 10.

Figure 3:
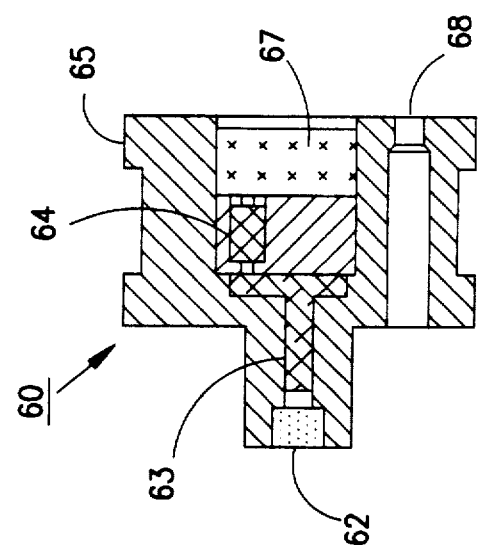
FIG. 3 is a sectional view showing the secondary ignition device for the preferred embodiment of the invention.

The activation means 60, a component of the improved ignition train apparatus as shown in FIG. 3, is disposed within the gas generator means 30 and is supported and stabilized by the housing 31 and the manifold 50. The activating means 60 consists of a housing 65 which contains a primer 62, a secondary ignition material 63, a pyrotechnic delay column 64 and the ignition charge 67. The ignition material 63 communicates with the delay column 64 upon activation. The delay column 64, after function, communicates with and activates the output ignition charge 67 which in turn communicates with the combustible material 32 of the gas generating means 30.

When the initiating means 21 retained in an initiator support 25 is activated upon receipt of the electrical firing signal from the power source, it functions to produce the high velocity stream of hot gases and metallic particles 29 as shown in FIG. 2. The particle stream 29 strikes the seal disk 54 causing it to rupture, the inert gas 12 is released to flow out through the channel 57 through the gas filter 52 and the ports 56. The gases 12 flow into the interior of the airbag 80, after the seal disk 54 has been ruptured, causing the airbag 80 to start to inflate. The high velocity particle stream 29 then impinges on the primer 62, which due the shock, pressure and momentum of the particle stream 29, causes it to function, igniting the ignition material 63. The combustion of the ignition material 63 ignites the pyrotechnic delay column 64 which burns for a predetermined time and then ignites the output ignition material 67, which communicates with the combustible material 32 of the gas generating means 30 to supply hot gases to the inflation process. The hot gases flow from the gas generating means 30 through the grain trap 34, the filter 35 and the flow orifices 36. The hot gases mix with the cold gas 12 as they flow though the stored gas means 11, then through the nozzles 55 to communicate with the channel 57. The mixed gases continue to flow through the filter 52 supported and retained by an initiator housing 51 and the ports 56 into the airbag 80, where they augment the cold gases and fully inflate the airbag 80 to protect the vehicle occupant during the vehicle impact.

Figure 5:
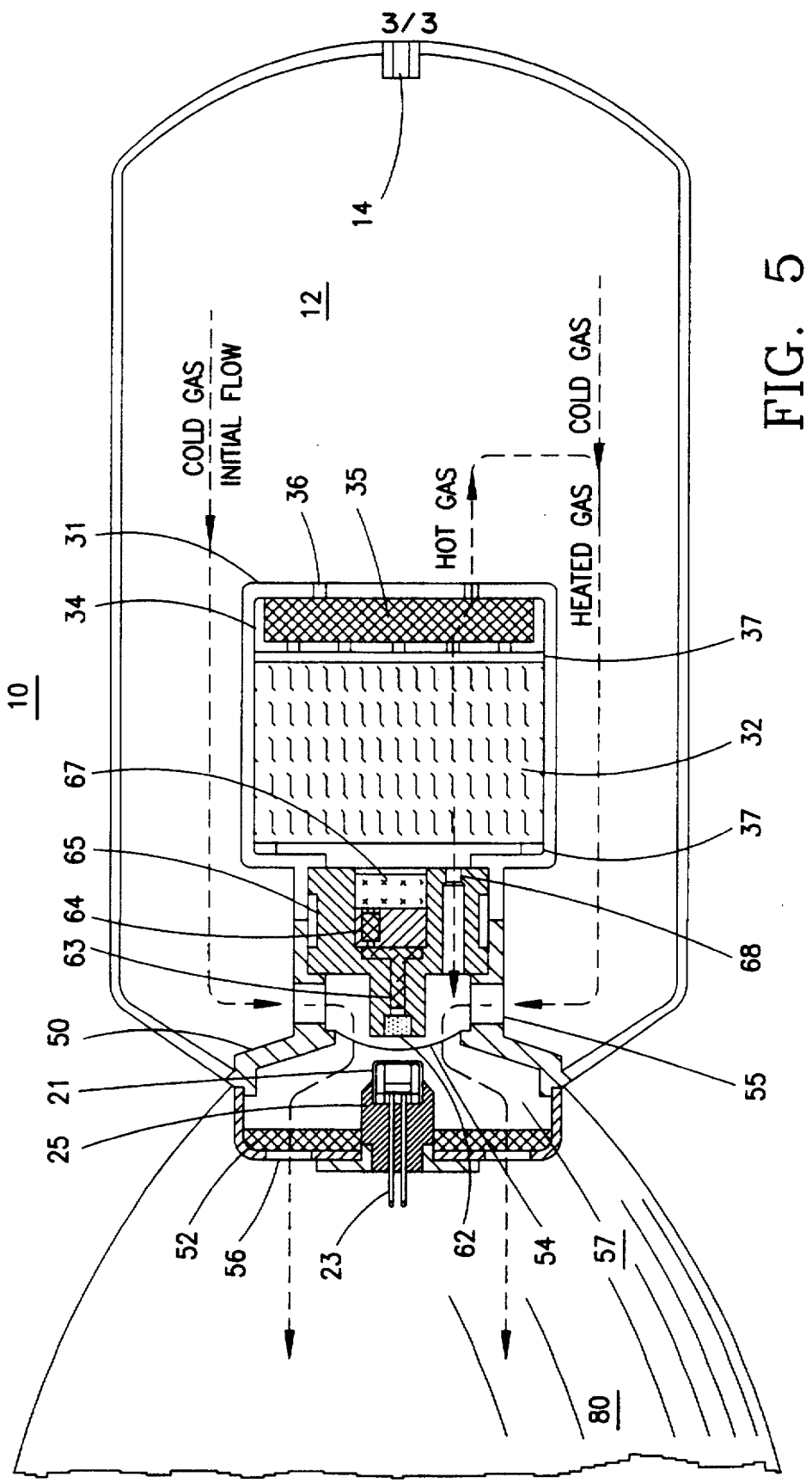
FIG. 5 shows a sectional view of the improved ignition means bypass nozzle function of the gas generating means for both embodiments of the invention.

The function of the bypass nozzle 68 is more clearly shown in the drawing of FIG. 5. When the propellant ignition charge 67 has been ignited by the delay column 64, the internal volume of the gas generating means 30 is filled with hot gases and burning particles which immediately ignite the combustible material 32. As the pressure starts to rise the hot gases begin to flow through the filter 35 and the nozzles 36 into the pressure vessel 11. At the same time they begin to flow through the bypass nozzle 68 into the channel 57, where they mix with the cold gas which is already flowing into the channel 57 and into the airbag 80 since the seal disk 54 has previously been ruptured. The delay time provided by the pyrotechnic delay column 64 has enabled the initial staged flow of cold gas into the airbag 80 to produce the initial low flow rate desired for breakout and initial slow expansion of the airbag 80. The staged flow of hot gases through the bypass nozzle 68 provides an immediate increase in the total mass flow rate of gases through the channel 57. At the same time, the heat and turbulence produced by the hot gases cause mixing of the hot and cold gases and provide an increase in pressure in the channel 57 which produces an immediate increase in flow through the ports 56 into the airbag 80. The higher flow rate is continuously enhanced, providing the second desired stage of inflation of the airbag 80.

The hot gases also continue flowing from the gas generating means 30 through the nozzles 36 continue to mix with and heat the cold gas in the pressure containing means 11 to sustain and complete the staged inflation of the airbag 80.

DESCRIPTION OF THE SECOND EMBODIMENT OF THE INVENTION

Figure 4:
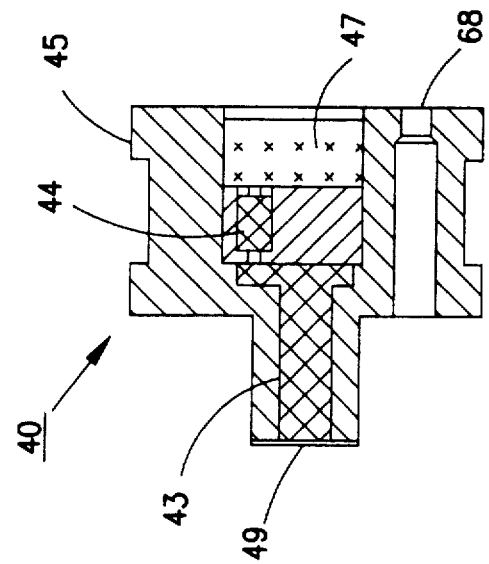
FIG. 4 is a sectional view showing the secondary ignition device for the second embodiment of this invention.

In the second embodiment of the improved ignition train apparatus and bypass nozzle of this invention, shown in FIG. 4, the ignition means 60 of FIG. 3 is replaced by the ignition means 40 of FIG. 4. In this embodiment, the high velocity stream of hot gases and metallic particles 29 from the initiation means 21 impinges first on the seal disk 54, causing it to rupture. The effect to this point is the same as for the first embodiment of the invention. In this case, however, the particle stream 29 next impinges on the closure disk 49. The particle stream 29 penetrates the disk 49, igniting the ignition charge 43. The process thereafter is identical to that produced in the primary embodiment of the invention.

The above description of the invention has been defined for the purpose of illustration and description. Therefore the description is not intended to limit the invention to the configurations defined herein. Other variations and modifications similar to the above defined descriptions, common industry design and application practices are within the scope of this invention. The embodiment described above explain best modes known of practicing the invention. Further on, the intention is to allow others skilled in the art to use the invention in such, or other, embodiments and with the various modifications of this invention. It is intended that the following claims be interpreted to include alternative embodiments to the extent permitted by the prior art.

We claim:

1. An apparatus for inflating an inflatable vehicle occupant restraint comprising:

a container for storing a compressed gas, said container including a rupturable wall which is rupturable to define a gas exit opening in fluid communication with said inflatable vehicle occupant restraint;

a pyrotechnic gas generator having a combustion gas outlet directed into said compressed gas container for mixing a gas output of said pyrotechnic gas generator with said compressed gas;

a pyrotechnic delay train having an input end and an output end, said output end adapted to initiate combustion of said pyrotechnic gas generator at a predetermined period after initiation of said input end, said pyrotechnic delay train comprising an ignition charge, a delay column and an output charge, said ignition charge adapted for igniting said delay column, said output charge adapted for igniting said gas generator material, said pyrotechnic delay train further including a primer for initiating said ignition charge; and an initiator for rupturing said rupturable wall and for initiating said input end of said pyrotechnic delay train, whereby said compressed gas begins to flow substantially immediately after said rupturable wall is ruptured and said pyrotechnic gas generator begins to produce said gas output after a predetermined delay.

2. An apparatus for inflating an inflatable vehicle occupant restraint comprising:

a container for storing a compressed gas, said container including a rupturable wall which is rupturable to define a gas exit opening;

a pyrotechnic gas generator having a combustion gas outlet directed into said compressed gas container for mixing a first portion of a combustion gas output of said pyrotechnic gas generator with said compressed gas;

an initiator for rupturing said rupturable wall and for initiating said pyrotechnic gas generator;

a manifold having an inlet in fluid communication with said gas exit opening, said manifold further including an outlet in fluid communication with said inflatable vehicle occupant restraint;

means for directing a second portion of said combustion gas output from said gas generator directly into said manifold, for heating and increasing pressure of gas within said manifold.

3. The apparatus of claim 2 wherein said manifold inlet is sized for controlling a flow of gas from said compressed gas container into said inflatable vehicle occupant restraint.

4. The apparatus of claim 2 wherein said initiator comprises a pyrotechnic primer capable of producing a high velocity stream of gases and particles for rapturing said rupturable wall.

5. The apparatus of claim 2 wherein said outlet of said gas generator further includes a filter to substantially permit egress of gaseous products only.

6. An apparatus for inflating an inflatable vehicle occupant restraint comprising:

a container for storing a compressed gas, said container including a rupturable wall which is rupturable to define a gas exit opening;

a pyrotechnic gas generator having a combustion gas outlet directed into said compressed gas container for mixing a first portion of a combustion gas output of said pyrotechnic gas generator with said compressed gas;

a pyrotechnic delay train having an input end and an output end, said output end adapted to initiate combustion of said pyrotechnic gas generator at a predetermined period after initiation of said input end;

an initiator for rupturing said rupturable wall and for initiating said input end of said pyrotechnic delay train;

a manifold having an inlet in fluid communication with said gas exit opening, said manifold further including an outlet in fluid communication with said inflatable vehicle occupant restraint, said manifold further including a bypass opening for directing a second portion of said combustion gas output from said gas generator directly into said manifold, for heating and increasing pressure of gas within said manifold.

7. A method for inflating an inflatable vehicle occupant restraint comprising:

rupturing a seal to release a compressed gas from a container into a manifold in fluid communication with said vehicle occupant restraint;

initiating a pyrotechnic delay train; and initiating, with an output of said pyrotechnic delay train, a pyrotechnic gas generator for producing combustion gas upon initiation;

outputting said combustion gas through a first gas output in said pyrotechnic gas mixing said combustion gas from said first gas output with said compressed gas in said container;

outputting said combustion gas through a second gas output in said pyrotechnic gas generator; and mixing within said manifold, said combustion gas from said second gas output with the mixture of said combustion gas from said first gas output and said compressed gas.

* * * * *